United States Patent
Hazawa et al.

(10) Patent No.: US 9,162,635 B2
(45) Date of Patent: Oct. 20, 2015

(54) VEHICLE DOOR

(71) Applicant: HONDA MOTOR CO., LTD., Tokyo (JP)

(72) Inventors: Hiroyuki Hazawa, Utsunomiya (JP); Shigeki Tanimoto, Shimotsuke (JP); Takayuki Hira, Kawachi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/368,404

(22) PCT Filed: Dec. 18, 2012

(86) PCT No.: PCT/JP2012/082789
§ 371 (c)(1),
(2) Date: Jun. 24, 2014

(87) PCT Pub. No.: WO2013/099699
PCT Pub. Date: Jul. 4, 2013

(65) Prior Publication Data
US 2015/0028621 A1 Jan. 29, 2015

(30) Foreign Application Priority Data

Dec. 27, 2011 (JP) .................................. 2011-285690

(51) Int. Cl.
*B60R 13/04* (2006.01)
*B60J 5/10* (2006.01)
*B60R 13/06* (2006.01)

(52) U.S. Cl.
CPC ................. *B60R 13/04* (2013.01); *B60J 5/102* (2013.01); *B60R 13/06* (2013.01)

(58) Field of Classification Search
CPC ............. B60J 5/101; B60J 5/10; B60J 5/102; B60R 13/04; B60R 13/06
USPC ............................. 296/56, 76, 146.8; 49/502
See application file for complete search history.

(56) References Cited

U.S. PATENT DOCUMENTS 4,822,098 A * 4/1989 Vogt et al. .................. 296/146.5
7,614,681 B2 * 11/2009 Saitoh et al. ............... 296/146.5

FOREIGN PATENT DOCUMENTS

| JP | 2007-176359 | 7/2007 |
| JP | 2007-276606 | 10/2007 |
| WO | 2008/041475 | 4/2008 |
| WO | 2011/135798 | 11/2011 |

\* cited by examiner

*Primary Examiner* — Joseph D Pape
(74) *Attorney, Agent, or Firm* — Rankin, Hill & Clark LLP

(57) ABSTRACT

The present invention relates to a vehicle door which is mounted via a hinge (14) to an upper edge portion of a door opening portion (12) that is formed on a vehicle body and which is pivotable in an up-down direction and which includes a door body (15) formed of metal, a decorative member (18) that is attached to a vehicle outer side of a lower portion of the door body (15), an outer plate portion (30) which is mounted on the decorative member (18) and disposed to be spaced apart from a vehicle outer side surface of the door body (15) and which has a predetermined width in the up-down direction and extends over a substantially overall width in a door width direction, a bottom plate portion (31) which is mounted on the decorative member (18) and extends from a lower end of the outer plate portion (30) to a vehicle inner side so as to be directed to a position lower than a lower end of the door body (15), and a protruding plate portion (32) which is provided on the decorative member (18) and protrudes upward from a position close to a vehicle inner side tip of the bottom plate portion (31), the protruding plate portion having an upper end extending further upward than the lower end of the door body (15) and being continuously formed in a direction from a position close to a first end portion to a position close to a second end portion of the outer plate portion (30) in the door width direction, the protruding plate portion being in contact with the vehicle outer side surface of a lower end portion of the door body (15).

9 Claims, 7 Drawing Sheets

VEHICLE DOOR

BACKGROUND OF THE INVENTION

1. Technical Field

The present invention relates to a vehicle door.

Priority is claimed on Japanese Patent Application No. 2011-285690, filed on Dec. 27, 2011.

2. Background Art

A door having a structure in which a garnish (a decorative member) is mounted on an outer side of a metal-based door body has been known as a vehicle door, such as a tail gate.

A tail gate has been disclosed in, for example, PTL1. In this tail gate, an outer plate portion which extends, in an up-down direction, on a vehicle outer side of a door body and which forms a design surface and a lower end extension plate portion which extends, substantially horizontally in an in-out direction of a vehicle interior, from a lower end edge portion of the outer plate portion are provided on a lower garnish which is mounted on a lower portion of the door body. Furthermore, attachment seat portions are provided on a part of the lower end extension plate portion, and a frame unit of the door body, which is constituted by a steel plate material, is clipped onto the attachment seat portions and comes into contact therewith.

CITATION LIST

Patent Literature

[PTL 1] Japanese Unexamined Patent Application, First Publication No. 2007-176359

SUMMARY OF THE INVENTION

Technical Problem

However, the tail gate of the related art has a structure in which the lower garnish is supported to the door body by using only the attachment seat portions which are provided on a part of the lower garnish in a door width direction (a vehicle width direction). In this structure, the lower garnish and the frame unit are in contact at only the attachment seat portions. Thus, when the tail gate is closed strongly, there is a possibility that a part of the outer plate portion of the lower garnish, which is spaced apart from the attachment seat portions, may be deformed or bent. Accordingly, there is a problem of the merchantability being deteriorated.

Furthermore, in a case where water which flows into a portion between the outer plate portion and the frame unit is collected on an upper portion of an extension plate portion, when the tail gate is opened, the water may spill from a location other than locations in which the attachment seat portions are provided and may fall into the near center of the lower portion of the tail gate opening portion. Thus, there is a possibility that the water may make a person who operates the tail gate wet. Accordingly, there is a problem of the merchantability being deteriorated.

For this reason, the present invention provides a vehicle door capable of improving merchantability.

Solution for Solving the Problem

To solve the problems described above, the vehicle door according to an aspect of the invention is configured as follows.

That is, a vehicle door according to an aspect of the invention is a vehicle door which is mounted via a hinge to an upper edge portion of a door opening portion that is formed on a vehicle body and which is pivotable in an up-down direction and which includes a door body formed of metal, a decorative member that is attached to a vehicle outer side of a lower portion of the door body, an outer plate portion which is mounted on the decorative member and disposed to be spaced apart from a vehicle outer side surface of the door body and which has a predetermined width in the up-down direction and extends over a substantially overall width in a door width direction, a bottom plate portion which is mounted on the decorative member and extends from a lower end of the outer plate portion to a vehicle inner side so as to be directed to a position lower than a lower end of the door body, and a protruding plate portion which is provided on the decorative member and protrudes upward from a position close to a vehicle inner side tip of the bottom plate portion, the protruding plate portion having an upper end extending further upward than the lower end of the door body and being continuously formed in a direction from a position close to a first end portion of the outer plate portion in the door width direction to a position close to a second end portion of the outer plate portion in the door width direction, the protruding plate portion being in contact with the vehicle outer side surface of a lower end portion of the door body.

In the vehicle door according to the aspect of the invention, it is preferable that the bottom plate portion have a tip portion which extends from a connecting portion between the protruding plate portion and the bottom plate portion to a position closer to a vehicle inner side than the lower end of the door body.

In the vehicle door according to the aspect of the invention, it is preferable that an upper surface of the tip portion is formed to be an inclined surface which gradually inclines downward from the connecting portion between the protruding plate portion and the tip portion in a direction from the vehicle outer side to the vehicle inner side.

In the vehicle door according to the aspect of the invention, it is preferable that a first protruding tip portion of the protruding plate portion in the door width direction be positioned spaced apart from a first bottom plate tip portion of the bottom plate portion in the door width direction to direct a second protruding tip portion of the projecting plate portion in the door width direction.

In the vehicle door according to the aspect of the invention, it is preferable that a contact portion which comes into contact with the vehicle outer side surface of the door body is provided, on the first bottom plate tip portion of the bottom plate portion, at a position spaced apart from the first protruding tip portion of the protruding plate portion.

In the vehicle door according to the aspect of the invention, it is preferable that the decorative member is formed by molding and the outer plate portion be formed separately from the bottom plate portion and the protruding plate portion.

In the vehicle door according to the aspect of the invention, it is preferable that the bottom plate portion have a bulging portion which bulges upward from an upper surface of the bottom plate portion and inside which a hand insertion recess open to a lower surface of the bottom plate portion is formed and a fixing portion which is fixed to the outer plate portion be provided on the bulging portion.

In the vehicle door according to the aspect of the invention, it is preferable that the protruding plate portion be provided at a position where the protruding plate portion is overlapped with the bulging portion in an in-out direction of the vehicle.

In the vehicle door according to the aspect of the invention, it is preferable that the outer plate portion have an attachment portion which bulges from a vehicle inner side surface of the outer plate portion to the vehicle inner side and is attached to the vehicle outer side surface of the door body by using an attachment member and that the fixing portion of the bottom plate portion be fastened to the attachment portion by using a fastening member.

In the vehicle door according to the aspect of the invention, it is preferable that a sealing member be provided to be interposed between the protruding plate portion and the vehicle outer side surface of the door body.

Advantageous Effects of Invention

According to the aspect of the invention, the projecting plate portion is continuously formed in the direction from the position close to the first end portion in the door width direction to the position close to the second end portion. In addition, the projecting plate portion comes into contact with the vehicle outer side surface of the lower end portion of the door body. Therefore, it is possible to prevent the outer plate portion from being bent when the door is closed strongly. Furthermore, the projecting plate portion is provided, and thus it is possible to prevent an inner portion of the decorative member from being seen through a portion between the door body and the bottom plate portion of the decorative member.

When the door is opened, the projecting plate portion prevents the water, which has flowed into the portion between the decorative member and the door body and has been collected on the bottom plate portion, from leaking out. Accordingly, it is possible to prevent the water from falling into the near center of the lower portion of the door opening portion.

According to the aspect of the invention, the lower end of the door body can be covered with the bottom plate portion of the decorative member. Thus, the door body formed of metal can be less visible when the door is opened.

Furthermore, when the decorative member is displaced in the up-down direction, a tip portion of the bottom plate portion of the decorative member can come into contact with the lower end of the door body. Thus, it is possible to prevent the decorative member from being displaced in the up-down direction.

According to the aspect of the invention, it is possible to prevent the water from being collected in a corner portion on the vehicle inner side, which is formed between the protruding plate portion and the tip portion of the bottom plate portion, when the door is closed.

According to the aspect of the invention, the water which is collected between the outer plate portion and the protruding plate portion can be drained through a portion which is located at a position (in the vicinity) close to the first bottom plate tip portion of the bottom plate portion in the door width direction and in which the protruding plate portion is not provided. As a result, it is possible to reduce the possibility that the water may make a person who stands near the door wet, compared to a case where the water is drained from the near center of the lower portion of the door opening portion. Furthermore, a portion which is stained due to the drained water can be limited to the less-noticeable first bottom plate tip portion of the bottom plate portion. Thus, the stain can be less noticeable.

According to the aspect of the invention, it is possible to support the end portion of the bottom plate portion by the door body even when the length of the protruding plate portion is shorter than the overall length of the bottom plate portion in the door width direction. Thus, it is possible to effectively prevent bending of the outer plate portion.

In a case where the outer plate portion, the bottom plate portion, and the protruding plate portion are integrally formed, it is necessary to perform die-cutting by using a slide mold or the like because the outer plate portion and the protruding plate portion extend in the same direction. According to the aspect of the invention, however, the outer plate portion is formed separately from the bottom plate portion and the protruding plate portion, and thus it is unnecessary to use a slide mold or the like. As a result, moldability is improved. In addition, die forming includes casting using metal as a casting material, injection molding using resin as an injection material, and the like.

According to the aspect of the invention, the bulging portion having high rigidity is fixed to the outer plate portion, and thus mounting rigidity of the outer plate portion relative to the bottom plate portion is improved.

According to the aspect of the invention, an operation load caused when an operator inserts his or her hand into the bulging portion and closes the door can be transmitted via the protruding plate portion to the door body. Therefore, it is possible to prevent bending of the outer plate portion in the vicinity (at a position close to the bulging portion) of the bulging portion.

When fastening the fixing portion using the fastening member, it is necessary to provide a portion to be fastened for fastening the fastening member to the outer plate portion. According to the aspect of the invention, the fastening member is fastened to the attachment portion which is formed to bulge from the outer plate portion toward the vehicle inner side. Therefore, the bottom plate portion can be fastened, using the fastening member, to the outer plate portion without influencing a surface of the outer plate portion as a design surface, which is positioned on the vehicle outer side. Thus, it is possible to simplify a structure of the outer plate portion.

According to the aspect of the invention, it is possible to ensure sealing properties between the protruding plate portion and the door body. In addition, impact noise caused by impact of the protruding plate portion against the door body when the door is strongly closed can be reduced.

DETAILED DESCRIPTION OF THE INVENTION

Hereinafter, an embodiment of a vehicle door according to this invention will be described with reference to the drawings in FIGS. 1 to 7.

In the following description, a right-left direction is a right-left direction when a vehicle body is viewed from a rear side to a front side. The right-left direction is coincident with a door width direction of a tail gate.

Figure 1:
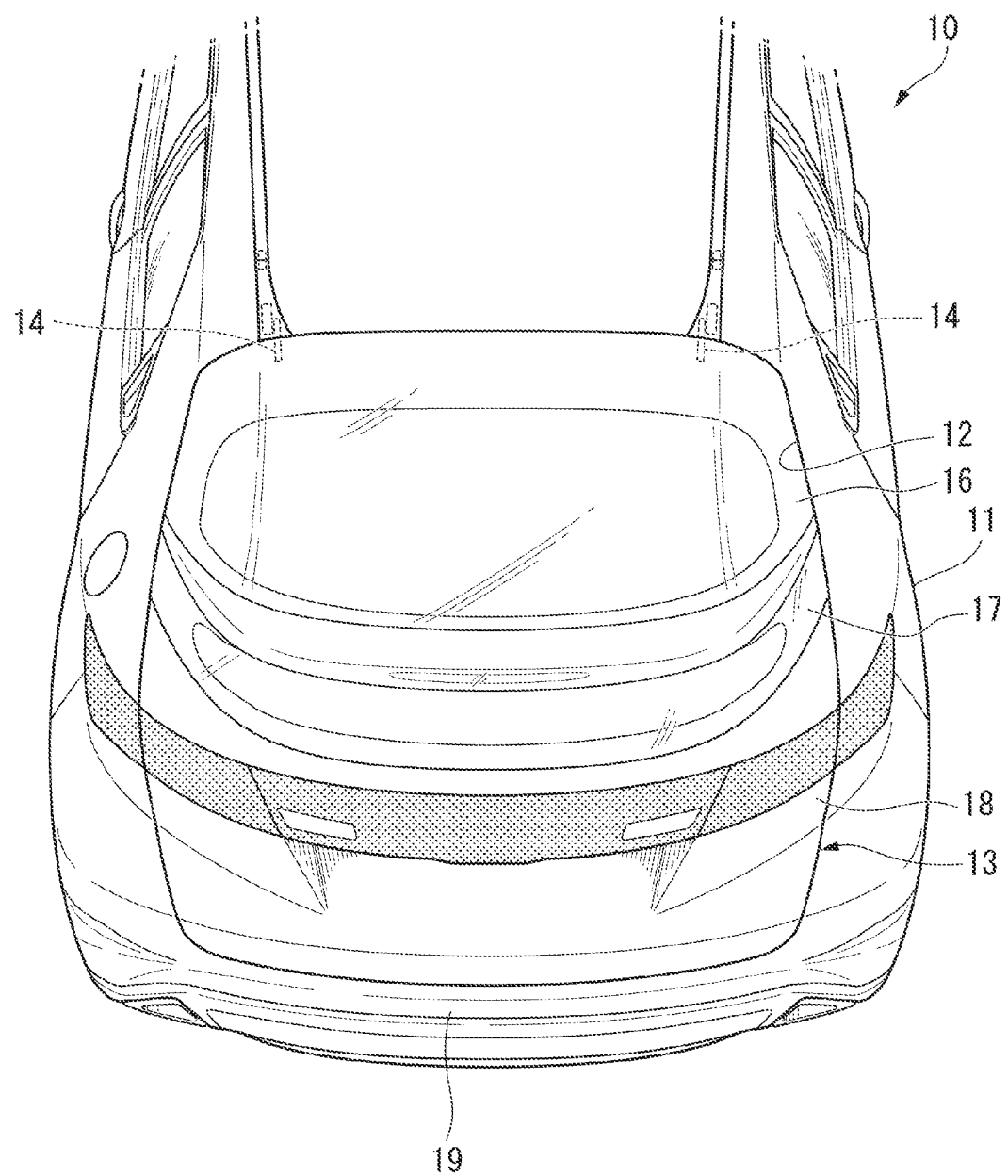
FIG. 1 is a perspective view of a rear portion of a vehicle which includes a tail gate as a vehicle door in an embodiment of the invention.

A tail gate opening portion (a door opening portion) 12 is formed on a rear portion of a vehicle body 11 of a vehicle 10, as illustrated in FIG. 1. An upper portion of a tail gate (a vehicle door) 13 is pivotally held, via a hinge 14, to an upper edge portion of the tail gate opening portion 12. The tail gate 13 pivots in an up-down direction, on the upper portion thereof, and thus the tail gate opening portion 12 is opened or closed.

Figure 2:
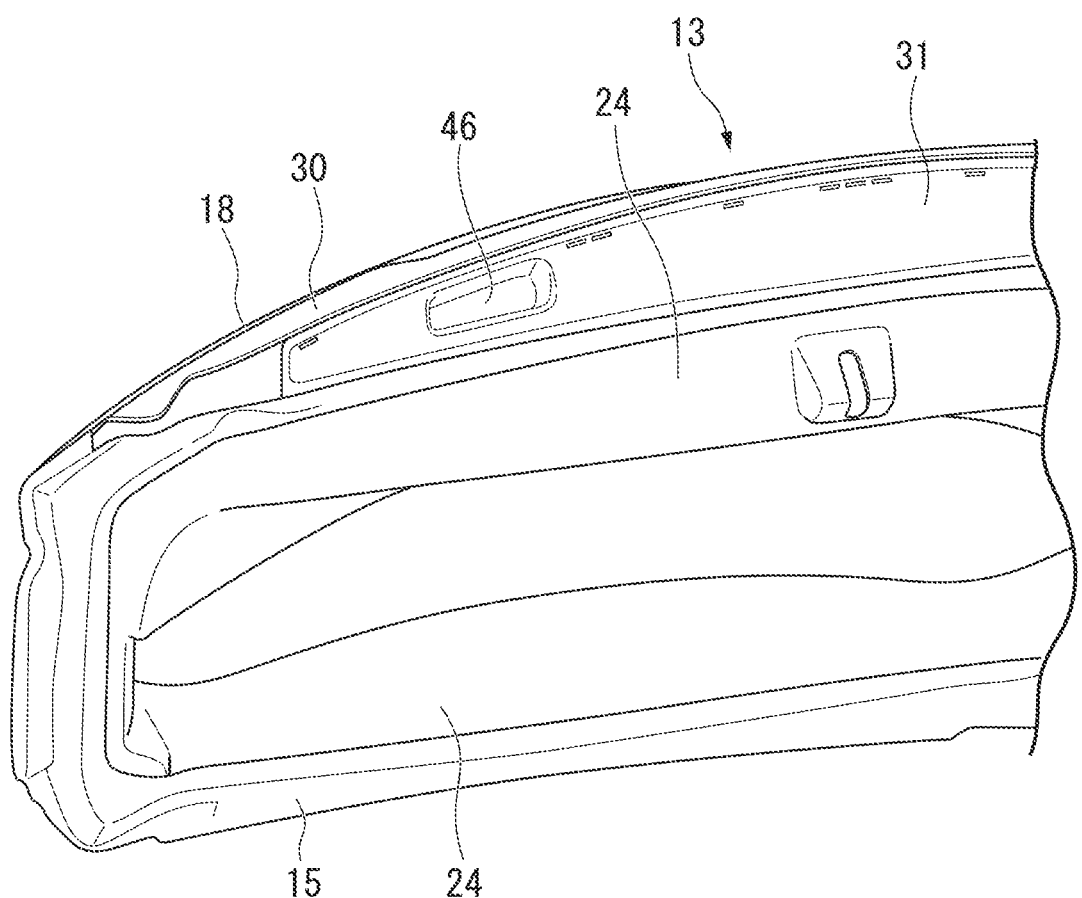
FIG. 2 is a perspective view of a left half of the tail gate of the embodiment of the invention, in an opened state, when viewed from a lower side.

The tail gate 13 includes a frame unit 15 (see FIGS. 5 to 7) as a door body, which is disposed on the vehicle inner side and constituted by a steel plate, a plurality of members which are attached to a vehicle outer side of the frame unit 15, and a trim 24 (see FIG. 2) attached to the vehicle inner side of the frame unit 15. FIG. 2 is a perspective view of a left half of the tail gate 13 in an opened state when viewed from a lower side.

The plurality of members which are attached to the vehicle outer side of the frame unit 15 will be described with reference to FIG. 1. A rear window panel 16 formed of glass is attached to an upper portion on the vehicle outer side of the frame unit 15. An extra window panel 17 formed of resin is attached to the vehicle outer side of the frame unit 15 and to a lower side of the rear window panel 16. A lower garnish (a decorative member) 18 formed of resin is attached to a lower portion on the vehicle outer side of the frame unit 15.

Figure 7:
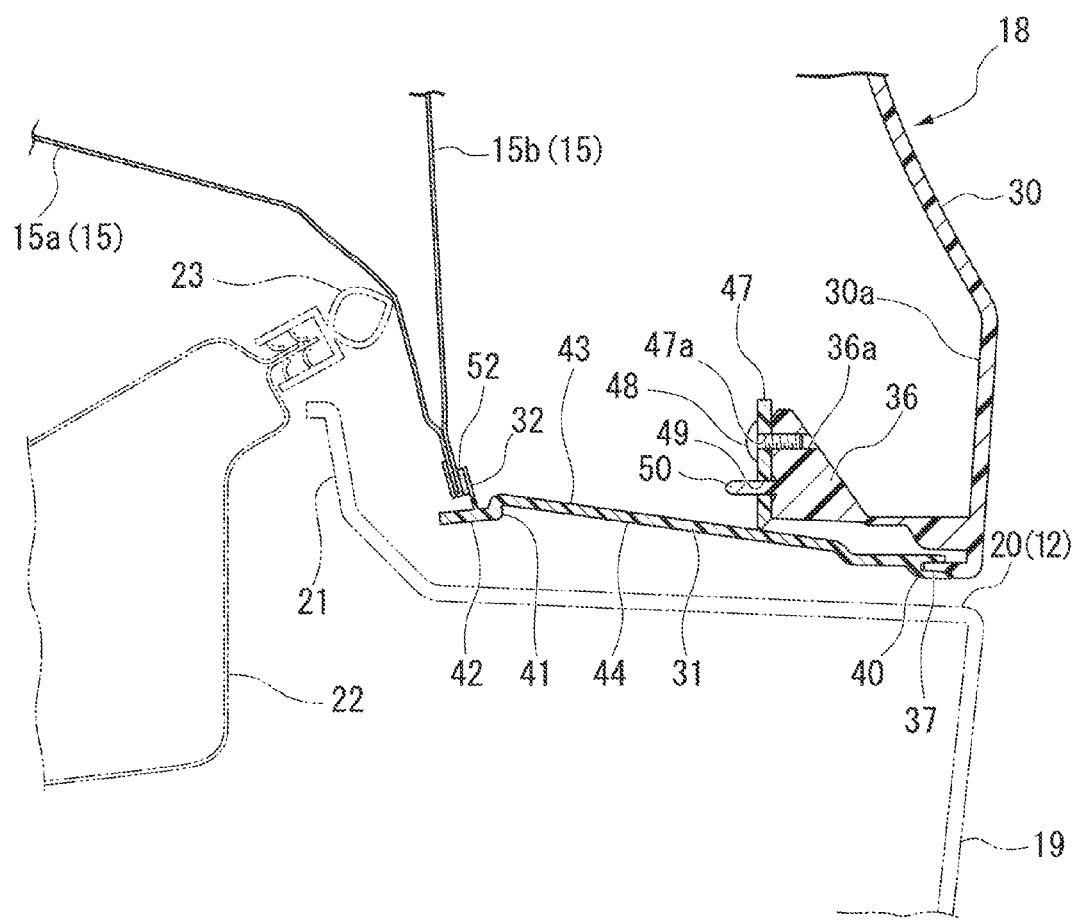
FIG. 7 is a cross-sectional view taken along line B-B in FIG. 4.

A lower portion of the tail gate opening portion 12 is constituted by an upper surface 20 of a resin-based rear bumper 19, which extends in a vehicle width direction, as illustrated in FIG. 7. An inclined surface 21 which gradually extends upward in a direction from a vehicle body rear side (the vehicle outer side) to a vehicle body front side is formed on a front portion of the upper surface 20, which is located on the vehicle body front side (the vehicle inner side). Furthermore, a rear panel 22 extending in the vehicle width direction is provided at a position closer to the vehicle body front side (the vehicle inner side) than the inclined surface 21 of the rear bumper 19 so as to be close to the inclined surface 21. A sealing member 23 which seals a gap between the tail gate 13 and the rear panel 22 is provided in the rear panel 22 in a state where the sealing member 23 extends in the vehicle width direction. When the tail gate 13 is in a closed state, the lower portion of the tail gate 13 is positioned close to an upper side of the upper surface 20 of the rear bumper 19, and the sealing member 23 provided on the rear panel 22 elastically comes into contact with an outer frame 15a of the frame unit 15 of the tail gate 13.

Figure 3:
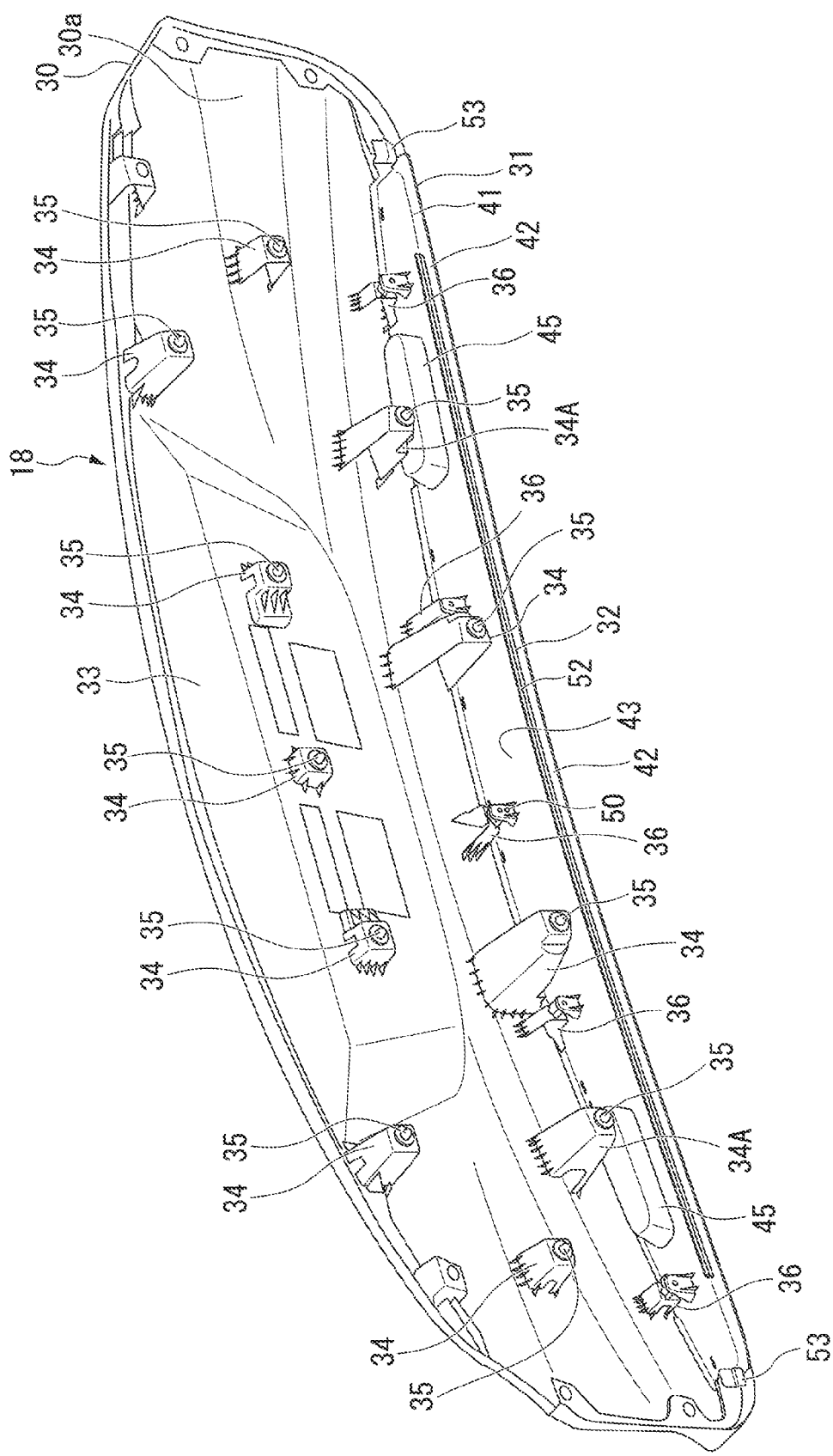
FIG. 3 is a perspective view of the entirety of a lower garnish of the embodiment of the invention, when viewed from an upper right side of a vehicle inner side.
Figure 4:
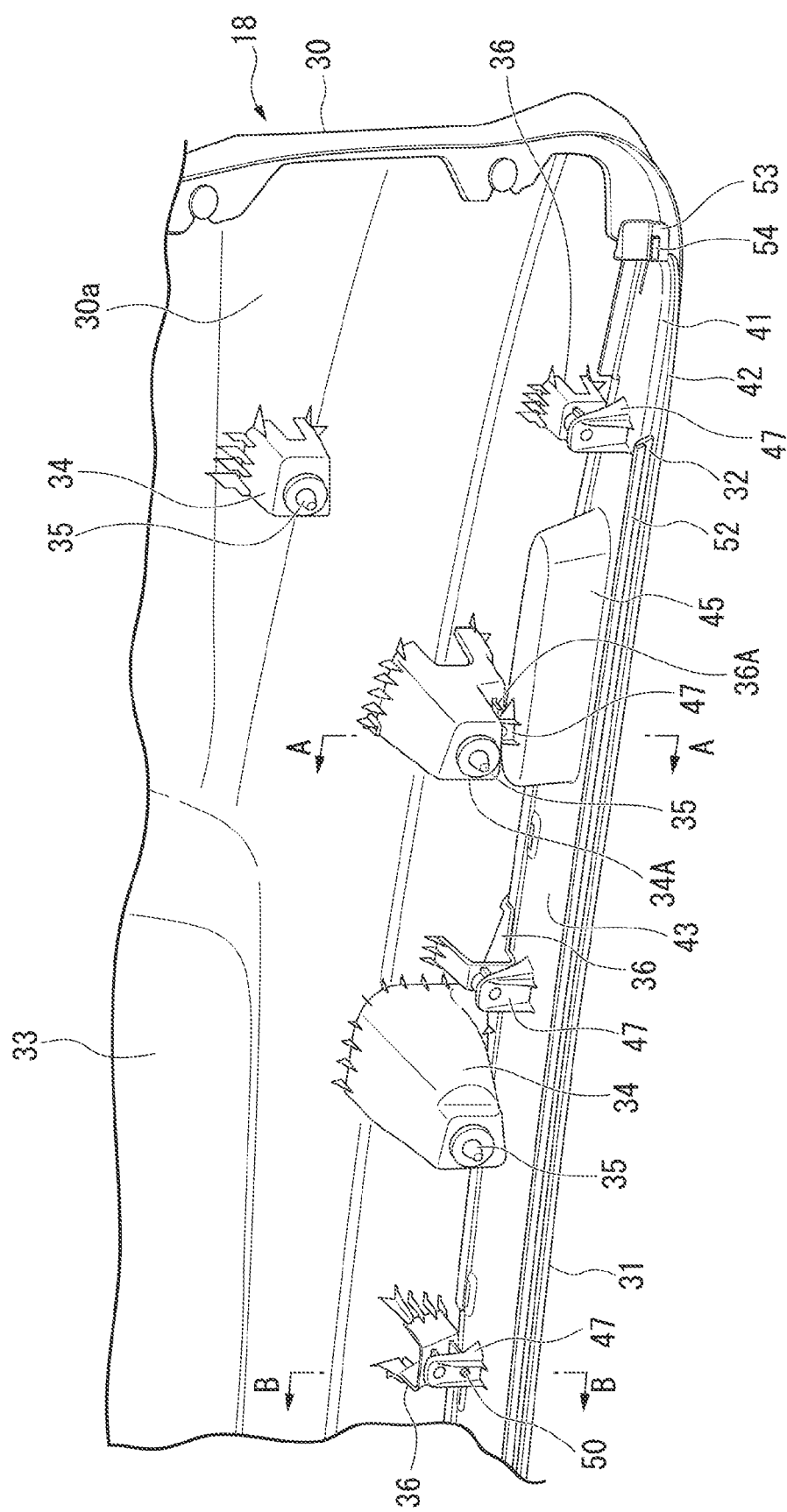
FIG. 4 is a perspective view of a left half of the lower garnish of the embodiment of the invention, when viewed from an upper left side of the vehicle inner side.

FIG. 3 is a perspective view of the entirety of the lower garnish 18, when viewed from an upper right side of a vehicle inner side. FIG. 4 is a perspective view of a substantially left half of the lower garnish 18, when viewed from an upper left side of the vehicle inner side. The lower garnish 18 includes an outer plate portion 30 which forms a design surface, a bottom plate portion 31 which is disposed so as to face the upper surface 20 of the rear bumper 19 when the tail gate 13 is closed, and a projecting plate portion (a protruding plate portion) 32 which is integrally formed with the bottom plate portion 31. The bottom plate portion 31 having the projecting plate portion 32 is formed separately from the outer plate portion 30. Both the bottom plate portion 31 and the outer plate portion 30 are formed by injecting resin into a mold die.

The outer plate portion 30 is disposed to be spaced apart from an inner frame 15b (a vehicle outer side surface) of the frame unit 15 such that a gap is formed between the frame unit 15 and the outer plate portion 30. The outer plate portion 30 has a predetermined width in the up-down direction and is formed to extend over the whole width of the tail gate 13 in a width direction (that is, the door width direction). A middle portion of the outer plate portion 30 protrudes toward the vehicle body rear side such that the middle portion of the outer plate portion 30 in the door width direction is positioned at a position closer to the vehicle body rear side than both end portions of the outer plate portion 30.

A number plate attachment portion 33 which is formed to sink toward the vehicle body front side (the vehicle inner side) is provided at an upper middle portion of the outer plate portion 30.

In addition, a vehicle inner side surface 30a of the outer plate portion 30 is dotted with a plurality of first attachment seat portions (attachment portions) 34 which are used for attaching the outer plate portion 30 to the frame unit 15. Specifically, the first attachment seat portions 34 are provided in a total of 11 locations, that is, three locations on the number plate attachment portion 33, two locations which are located on both sides of the number plate attachment portion 33 and located on an upper edge of the outer plate portion 30, two locations which are located on a middle portion of the outer plate portion 30 in a vertical direction and located close to both ends of the middle portion in the door width direction, and four locations on a lower portion of the outer plate portion 30. The first attachment seat portions 34 protrude from the vehicle inner side surface 30a of the outer plate portion 30 to the vehicle body front side (the vehicle inner side) and are integrally formed with the outer plate portion 30.

A resin-based clip (an attachment member) 35 which is used for connecting the lower garnish 18 and the inner frame 15b of the frame unit 15 is attached to a tip portion of the first attachment seat portion 34.

A flange portion 37 which is bent from the lower end toward the vehicle body front side (the vehicle inner side) and extends in the door width direction is provided on a lower end of the outer plate portion 30, as illustrated in FIG. 7.

Furthermore, a plurality of second attachment seat portions 36 which are used for attaching the bottom plate portion 31 are provided, in a state where each of the second attachment seat portion 36 is spaced apart from each other in the door width direction, on a part of the outer plate portion 30, which is slightly-upwardly spaced apart from the flange portion 37 (the number of the second attachment seat portions 36 is seven, in this embodiment). The second attachment seat portions 36 protrude from the vehicle inner side surface 30a of the outer plate portion 30 to the vehicle body front side (the vehicle inner side) and are integrally formed with the outer plate portion 30.

Figure 6:
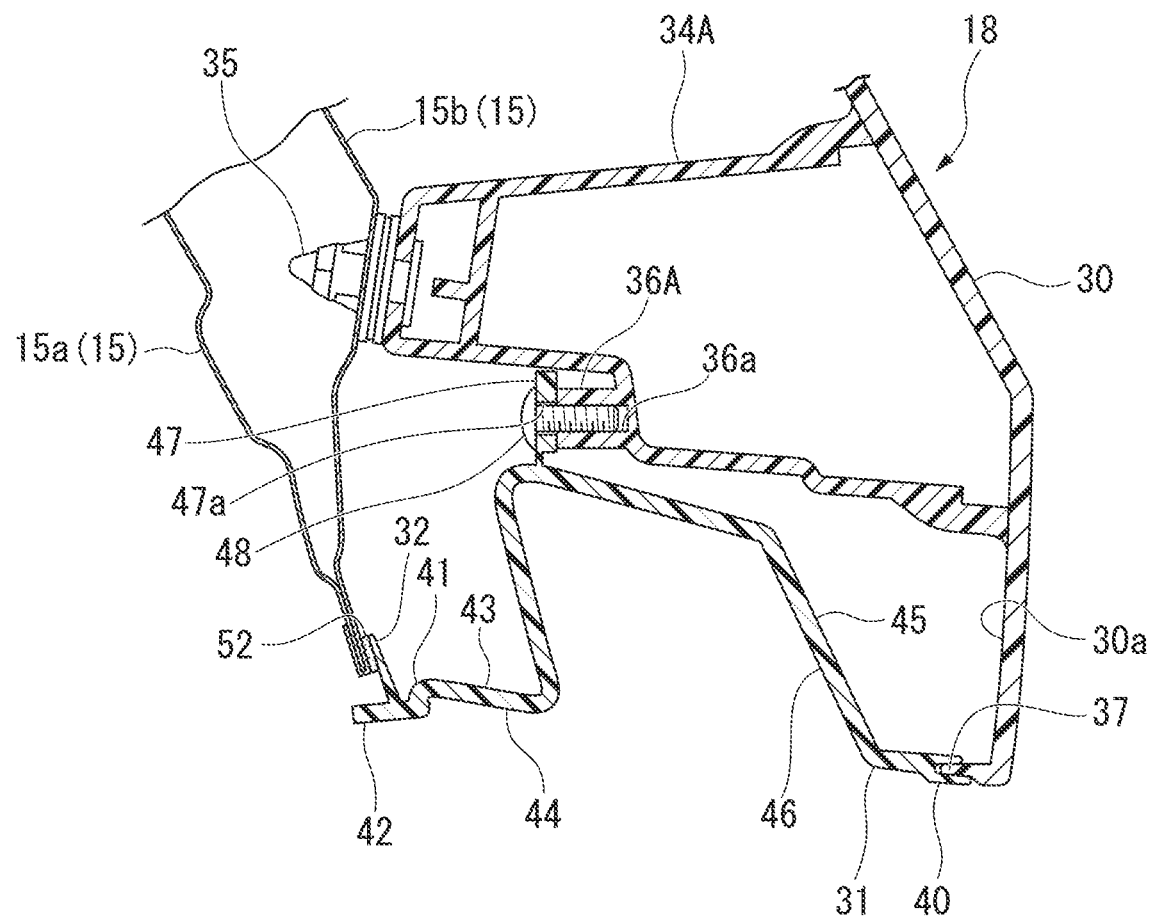
FIG. 6 is a cross-sectional view taken along line A-A in FIG. 4.

Two second attachment seat portions 36 of seven second attachment seat portions 36 are integrally formed with the first attachment seat portion 34, as illustrated in FIG. 6. In the following description, if it is necessary to distinguish the two second attachment seat portions 36 which are integrally formed with the first attachment seat portion 34 from the other second attachment seat portions 36, each of the two second attachment seat portions 36 will be marked as a second attachment seat portion 36A.

The bottom plate portion 31 has a substantially flat plate shape. The bottom plate portion 31 extends from a lower edge of the outer plate portion 30 to the vehicle body front side (the vehicle inner side) and is inclined such that the bottom plate portion 31 is gradually bent upward in the direction from the vehicle body outer side to the vehicle body front side. A length of the bottom plate portion 31 in the door width direction is slightly shorter than a length of the outer plate portion 30 in the door width direction. Tip portions of both end portions of the bottom plate portion 31 in the door width direction are positioned at a position closer to an inner side of the door width direction than tip portions of both end portions of the outer plate portion 30 in the door width direction.

An engaging portion 40 of which a cross-sectional surface has a U-shape is formed on the end portion of the vehicle body rear side (the vehicle outer side) of the bottom plate portion 31 so as to extend in the door width direction, as illustrated in FIGS. 6 and 7. The flange portion 37 of the outer plate portion 30 is fitted to this engaging portion 40.

A tip of the bottom plate portion 31, which is located on the vehicle body front side (the vehicle inner side), is positioned lower than the lower end of the frame unit 15. In other words, the bottom plate portion 31 extends from the lower end of the outer plate portion 30 to the vehicle inner side so as to be directed to a position lower than the lower end of the frame unit 15.

A step portion 41 which is bent downward is formed on the tip of the vehicle body front side (the vehicle inner side) of the bottom plate portion 31. A draining portion (a tip portion) 42 is formed to extend to the vehicle body front side (the vehicle inner side) further from the lower end of the step portion 41. A tip of the draining portion 42 extends to a position closer to the vehicle body front side (the vehicle inner side) than the lower end of the frame unit 15. An upper surface of the draining portion 42 is inclined downward so as to be gradually bent downward in the direction from the vehicle body outer side to the vehicle body front side (the vehicle inner side).

A bulging portion 45 is formed in a portion close to both end portions of the bottom plate portion 31 in the door width direction. The bulging portion 45 bulges upward from an upper surface 43 of the bottom plate portion 31 and is open to a lower surface 44 of the bottom plate portion 31. An inner portion of the bulging portion 45 forms a hand insertion recess 46 (see FIGS. 2 and 6) into which an operator can insert a hand when performing a closing operation of the tail gate 13.

In addition, fixing plate portions (fixing portions) 47 which are used for attaching the bottom plate portion 31 to the frame unit 15 are formed to protrude upward from the upper surface 43 of the bottom plate portion 31. The fixing plate portions 47 are arranged to correspond, one-to-one, to the second attachment seat portions 36 of the frame unit 15. In other words, the number of the fixing plate portions 47 is the same as the number of the second attachment seat portions 36. Two fixing plate portions 47 of a plurality of the fixing plate portions 47 are provided on an upper surface of the bulging portion 45, as illustrated in FIG. 6. Two fixing plate portion 47 are provided at positions which correspond to positions of two second attachment seat portions 36A described above. That is, the first attachment seat portion 34 (hereinafter, if it is necessary to distinguish this first attachment seat portions 34 from other first attachment seat portions 34, this first attachment seat portions 34 will be marked as a first attachment seat portion 34A) which is provided with the second attachment seat portion 36A is disposed on an upper side of the bulging portion 45.

A screw insertion hole 47a is formed on the fixing plate portion 47. An engaging hole 36a is formed on the second attachment seat portion 36. The bottom plate portion 31 allows the flange portion 37 of the outer plate portion 30 to be fitted to the engaging portion 40. In addition, the bottom plate portion 31 is fixed to the outer plate portion 30 in such a manner that a screw (a fastening member) 48 which is inserted through the screw insertion hole 47a is fastened to the engaging hole 36a of the second attachment seat portion 36. The screw 48 is not illustrated in FIGS. 3 and 4.

Among the fixing plate portion 47, a positioning hole 49 is formed to penetrate the fixing plate portion 47 which is disposed on the middle of the bottom plate portion 31 in the door width direction, as illustrated in FIG. 7. A positioning pin 50 of the second attachment seat portion 36 is inserted into this positioning hole 49, and thus the positioning of the outer plate portion 30 in the door width direction is fixed with respect to the bottom plate portion 31.

The projecting plate portion 32 which extends and protrudes upward from the upper surface 43 is formed at a position close to the tip of the bottom plate portion 31 in the vehicle body front side (the vehicle inner side). The projecting plate portion 32 is continuously formed from the vicinity (a position close to one end portion) of one end portion of the bottom plate portion 31 to the vicinity (a position close to the other end portion) of the other end portion in the door width direction, as illustrated in FIG. 3. In terms of the relative relationship between the outer plate portion 30 and projecting plate portion 32, the projecting plate portion 32 is disposed so as to continuously extend from a position close to a first end portion (for example, a right end portion in the door width direction) of the outer plate portion 30 in the door width direction to a position close to a second end portion (for example, an end portion opposite to the first end portion, that is, the right end portion in the door width direction).

The projecting plate portion 32 protrudes upward from an upper surface of the draining portion 42, as illustrated in FIGS. 6 and 7.

Thus, in the embodiment, the draining portion 42 constitutes a tip portion of the bottom plate portion 31, which extends from a connecting portion between the projecting plate portion 32 and the draining portion 42 to a portion which is located at a position closer to the vehicle inner side than the lower end of the frame unit 15. As described above, the upper surface of the draining portion 42 is formed to incline downward so as to be gradually bent downward in the direction from the vehicle body outer side to the vehicle body front side (the vehicle inner side).

Tip portions of both end portions of the projecting plate portion 32 in the door width direction are positioned spaced apart from the tip portions, which face the tip portions of the projecting plate portion 32, of the end portions of the bottom plate portion 31 in the door width direction. In other words, a first protruding tip portion (for example, a right tip portion of the projecting plate portion 32) of the projecting plate portion 32 in the door width direction is positioned spaced apart from a first bottom plate tip portion (for example, a right tip portion of the bottom plate portion 31) of the bottom plate portion 31 in the door width direction in a state where the first protruding tip portion is directed to a second protruding tip portion (for example, a left tip portion of the projecting plate portion 32) of the projecting plate portion 32 in the door width direction. That is, a portion in which the projecting plate portion 32 is not provided is located on both end portions (the first bottom plate tip portion and the second bottom plate tip portion) of the bottom plate portion 31 in the door width direction. In addition, a part of the projecting plate portion 32 is overlapped with the bulging portion 45 in a front-rear direction (an in-out direction of the vehicle) of the vehicle body.

An upper end of the projecting plate portion 32 extends further upward than the lower end of the frame unit 15 and is disposed so as to face, in the front-rear direction of the vehicle body, a vehicle outer side surface of a lower end portion of the inner frame 15b of the frame unit 15. A sealing member 52 formed of a sponge adheres to, throughout the substantially overall length of the projecting plate portion 32 in the door width direction, an upper portion of a surface (a vehicle inner side surface) of the projecting plate portion 32, which is positioned on the vehicle body front side.

In a state where the lower garnish 18 is attached to the frame unit 15 by using the clip 35, the sealing member 52 is in pressure-contact with a surface (a vehicle outer side surface) of the inner frame 15b, which is positioned on the vehicle body rear side, of the frame unit 15. That is, the sealing member 52 is provided to be interposed between the projecting plate portion 32 and the inner frame 15b, and the vehicle inner side surface of the projecting plate portion 32 comes into contact with the vehicle outer side surface of the inner frame 15b, via the sealing member 52.

A second projecting plate portion (a contact portion) 53, which extends and protrudes upward from the upper surface 43, protrudes on tip portions of both end portions of the bottom plate portion 31 in the door width direction, as illustrated in FIGS. 3 and 4. The second projecting plate portion 53 is positioned spaced apart from the tip portion of the projecting plate portion 32 in the door width direction. An upper end of the second projecting plate portion 53 extends further upward than the lower end of the frame unit 15 and is disposed so as to face, in the front-rear direction of the vehicle body, the vehicle outer side surface of the lower end portion of the inner frame 15b of the frame unit 15. Also, a sealing member 54 formed of a sponge adheres to an upper portion of a surface (a vehicle inner side surface) of the second projecting plate portion 53, which is positioned on the vehicle body front side. In a state where the lower garnish 18 is attached to the frame unit 15 by using the clip 35, the sealing member 54 is also in pressure-contact with the surface (the vehicle outer side surface) of the inner frame 15b, which is positioned on the vehicle body rear side, of the frame unit 15. That is, the vehicle inner side surface of the second projecting plate portion 53 comes into contact with the vehicle outer side surface of the inner frame 15b via the sealing member 54.

Figure 5:
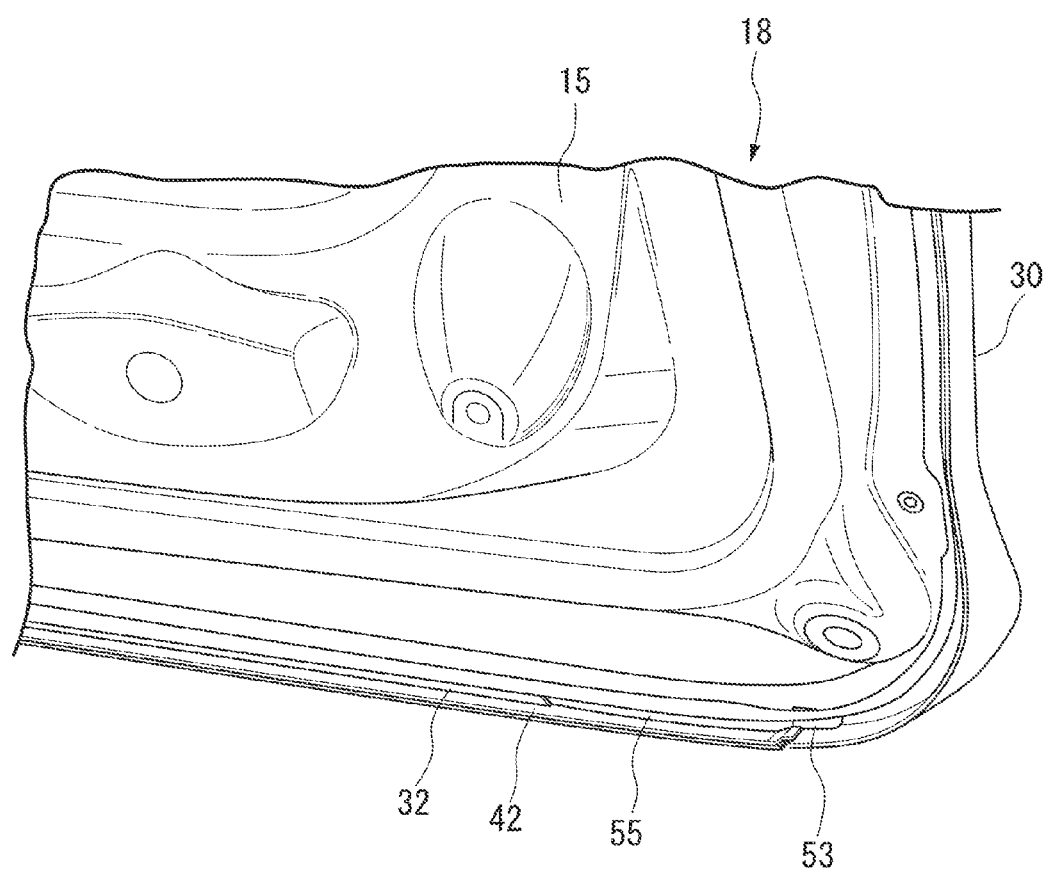
FIG. 5 is an enlarged perspective view of an end portion of the tail gate of the embodiment of the invention, when viewed from the vehicle inner side.

A portion in which the projecting plate portion 32 is not provided is formed in each end portion of the bottom plate portion 31 in the door width direction, and thus a portion between each tip portion of the projecting plate portion 32 in the door width direction and the second projecting plate portion 53 is opened. Therefore, in a state where the lower garnish 18 is attached to the frame unit 15 by using the clip 35, an opening 55 which communicates with a space between the lower garnish 18 and the frame unit 15 is formed between each tip portion of the projecting plate portion 32 in the door width direction and the second projecting plate portion 53, as illustrated in FIG. 5. The trim 24 is not illustrated in FIG. 5.

In the tail gate 13 configured as above, the projecting plate portion 32 is continuously formed from a position close to the first end portion of the lower garnish 18 in the door width direction to a position close to the second end portion. In addition, the projecting plate portion 32 is in contact with the vehicle outer side surface of the lower end portion of the inner frame 15b of the frame unit 15 via the sealing member 52. Therefore, an end portion of the bottom plate portion 31 can be supported by the frame unit 15, and thus it is possible to prevent the outer plate portion 30 from being bent when the tail gate 13 in an opened state is closed strongly.

In addition, the projecting plate portion 32 is provided, and thus it is possible to prevent an inner portion of the lower garnish 18 from being seen through a portion between the frame unit 15 and the bottom plate portion 31 of the garnish 18.

Furthermore, the second projecting plate portions 53 are respectively provided at the positions spaced apart from the tip portions of both end portions of the projecting plate portion 32 in the door width direction, and the second projecting plate portions 53 is in contact with the vehicle outer side surface of the lower end portion of the inner frame 15b via the sealing members 54. Thus, even when the length of the projecting plate portion 32 is shorter than the overall length of the bottom plate portion 31 in the door width direction, it is possible to support the end portion of the bottom plate portion 31 by the frame unit 15. Accordingly, it is possible to effectively prevent bending of the outer plate portion 30.

Particularly, the sealing member 52 is provided to be interposed between the projecting plate portion 32 and the inner frame 15b, and thus it is possible to ensure sealing properties between the projecting plate portion 32 and the frame unit 15. In addition, the sealing members 52 and 54 can reduce impact noise caused by impact of the projecting plate portion 32 and the second projecting plate portion 53 against the frame unit 15 when the tail gate 13 is closed strongly.

When the tail gate 13 is opened, the projecting plate portion 32 prevents the water, which flows into a portion between the frame unit 15 and the lower garnish 18 and is collected on the bottom plate portion 31, from leaking out from the near center of the lower portion of the tail gate opening portion 12. Accordingly, it is possible to prevent the water from falling into the near center of the lower portion of the tail gate 13.

Furthermore, in the lower garnish 18, the portion between each tip portion of the projecting plate portion 32 in the door width direction and the second projecting plate portion 53 is opened, and thus the opening 55 is formed. Therefore, when the tail gate 13 is opened, the water which has flowed into a portion between the frame unit 15 and the lower garnish 18 and has been collected on the bottom plate portion 31 flows along a surface of the projecting plate portion 32, which is positioned on the vehicle body rear side, to both end portions of the projecting plate portion 32 in the door width direction. Accordingly, the water is drained through the opening 55. As a result, it is possible to reduce the possibility that the water may make a person who stands near the door wet, compared to a case where the water is drained from the near center of the lower portion of the tail gate 13. Furthermore, portions which are stained due to the drained water can be limited to both end portions of the bottom plate portion 31, which are less noticeable. Thus, the stain can be less noticeable.

In addition, the draining portion 42 of the bottom plate portion 31 of the lower garnish 18 extends to a position closer to the vehicle body front side (the vehicle inner side) than the lower end of the frame unit 15, and thus the lower end of the frame unit 15 can be covered with the bottom plate portion 31 of the lower garnish 18. Accordingly, the frame unit 15 formed of metal can be less visible when the tail gate 13 is opened.

When the lower garnish 18 is displaced, in the up-down direction, relative to the frame unit 15, the draining portion 42 of the bottom plate portion 31 of the lower garnish 18 can come into contact with the lower end of the frame unit 15. Thus, it is possible to prevent the lower garnish 18 from being displaced, in the up-down direction, relative to the frame unit 15.

The draining portion 42 is inclined downward when the tail gate 13 is in the closed state, and thus, when the tail gate 13 is in the closed state, it is possible to prevent the water from being collected in a corner portion on the vehicle body front side (the vehicle inner side), which is formed by the projecting plate portion 32 and the draining portion 42. In addition, it is possible to prevent the water from falling from the corner portion when the tail gate 13 is opened.

Furthermore, two fixing plate portions 47 of the fixing plate portions 47 which are used for fixing the bottom plate portion 31 to the outer plate portion 30 are provided on the bulging portion 45 of the bottom plate portion 31, of which the rigidity is high, and thus it is possible to fix the bulging portion 45 having high rigidity to the outer plate portion 30. Accordingly, mounting rigidity of the outer plate portion 30 relative to the bottom plate portion 31 can be improved.

In addition, a part of the projecting plate portion 32 is provided to be overlapped, in the in-out direction of the vehicle, with the bulging portion 45, and thus an operation load caused when an operator inserts his or her hand into the hand insertion recess 46 inside the bulging portion 45 and closes the tail gate 13 can be transmitted via the projecting plate portion 32 to the frame unit 15. Therefore, it is possible to prevent bending of the outer plate portion 30 at a position close to the bulging portion 45.

The second attachment seat portion 36 which bulges from the vehicle inner side surface 30a of the outer plate portion 30 toward the vehicle inner side is provided and the fixing plate portion 47 of the bottom plate portion 31 is fastened and fixed to the second attachment seat portion 36 by the screw 48. Thus, the bottom plate portion 31 can be fastened to the outer plate portion 30 without influencing a surface of the outer plate portion 30 as a design surface, which is positioned on the vehicle outer side, and thus it is possible to simplify a structure of the outer plate portion.

Particularly, two fixing plate portions 47 which are provided in the bulging portion 45 are respectively fastened and fixed, by the screws 48, to two second attachment seat portions 36A which are integrally formed with the first attachment seat portions 34A to fix the outer plate portion 30 to the frame unit 15. Therefore, the bulging portion 45 having high rigidity can be fixed to the outer plate portion 30, and thus the mounting rigidity of the outer plate portion 30 relative to the bottom plate portion 31 can be improved.

In the lower garnish 18, the bottom plate portion 31 having the projecting plate portion 32 and the outer plate portion 30 are formed separately, and thus it is possible to improve moldability when performing injection molding. More specifically, when the outer plate portion 30, the bottom plate portion 31, and the projecting plate portion 32 are integrally formed, it is necessary to perform die-cutting by using a slide mold or the like because the outer plate portion 30 and the projecting plate portion 32 extend in the same direction. In contrast, when the outer plate portion 30 and the bottom plate portion 31 having the projecting plate portion 32 are formed separately, it is not necessary to use a slide mold or the like, and thus moldability is improved.

The invention is not limited to the embodiment described above.

Although the lower garnish 18 in the embodiment described above is formed of resin, the lower garnish 18, for example, may be formed of metal. In this case, the outer plate portion 30 and the bottom plate portion 31 which has the projecting plate portion 32 can be formed by casting with a casting mold.

In addition, the vehicle door is not limited to a tail gate and the decorative member is not limited to a lower garnish.

The preferred embodiment of the invention is described above. However, it should be understood that the embodiment described above is an exemplary example and is not intended to limit the invention. Additions, omissions, substitutions, and other modifications can be performed insofar as they do not depart from the scope of the invention. Thus, it should be considered that the invention is not limited by the description above and is limited only by the appended claims.

REFERENCE SIGNS LIST

10: vehicle
11: vehicle body
12: tail gate opening portion (door opening portion)
13: tail gate (vehicle door)
14: hinge
15: frame unit (door body)
18: lower garnish (decorative member)
30: outer plate portion
30a: vehicle inner side surface
31: bottom plate portion
32: projecting plate portion (protruding plate portion)
34: first attachment seat portion (attachment portion)
35: clip (attachment member)
42: draining portion (tip portion)
43: upper surface of bottom plate portion
44: lower surface of bottom plate portion
45: bulging portion
46: hand insertion recess
47: fixing plate portion (fixing portion)
48: screw (fastening member)
52: sealing member
53: second projecting plate portion (contact portion)

What is claimed is:

1. A vehicle door which is mounted via a hinge to an upper edge portion of a door opening portion that is formed on a vehicle body and which is pivotable in an up-down direction, comprising:

a door body formed of metal;

a decorative member which is attached to a vehicle outer side of a lower portion of the door body;

an outer plate portion which is mounted on the decorative member and disposed to be spaced apart from a vehicle outer side surface of the door body and which has a predetermined width in the up-down direction and extends over a substantially overall width in a door width direction;

a bottom plate portion which is mounted on the decorative member and extends from a lower end of the outer plate portion to a vehicle inner side so as to be directed to a position lower than a lower end of the door body; and a protruding plate portion which is provided on the decorative member and protrudes upward from a position close to a vehicle inner side tip of the bottom plate portion, the protruding plate portion having an upper end extending further upward than the lower end of the door body and being continuously formed in a direction from a position close to a first end portion to a position close to a second end portion of the outer plate portion in the door width direction, the protruding plate portion being in contact with the vehicle outer side surface of a lower end portion of the door body, wherein the bottom plate portion has a tip portion which extends from a connecting portion between the protruding plate portion and the bottom plate portion to a position closer to a vehicle inner side than the lower end of the door body, and an upper surface of the tip portion is formed to be an inclined surface which gradually inclines downward from the connecting portion between the protruding plate portion and the tip portion in a direction from the vehicle outer side to the vehicle inner side.

2. A vehicle door which is mounted via a hinge to an upper edge portion of a door opening portion that is formed on a vehicle body and which is pivotable in an up-down direction, comprising:

a door body formed of metal;

a decorative member which is attached to a vehicle outer side of a lower portion of the door body;

an outer plate portion which is mounted on the decorative member and disposed to be spaced apart from a vehicle outer side surface of the door body and which has a predetermined width in the up-down direction and extends over a substantially overall width in a door width direction;

a bottom plate portion which is mounted on the decorative member and extends from a lower end of the outer plate portion to a vehicle inner side so as to be directed to a position lower than a lower end of the door body; and a protruding plate portion which is provided on the decorative member and protrudes upward from a position close to a vehicle inner side tip of the bottom plate portion, the protruding plate portion having an upper end extending further upward than the lower end of the door body and being continuously formed in a direction from a position close to a first end portion to a position close to a second end portion of the outer plate portion in the door width direction, the protruding plate portion being in contact with the vehicle outer side surface of a lower end portion of the door body, wherein a first protruding tip portion of the protruding plate portion in the door width direction is positioned spaced apart from a first bottom plate tip portion of the bottom plate portion in the door width direction to direct a second protruding tip portion of the projecting plate portion in the door width direction.

3. The vehicle door according to claim 2, wherein a contact portion which comes into contact with the vehicle outer side surface of the door body is provided, on the first bottom plate tip portion of the bottom plate portion, at a position spaced apart from the first protruding tip portion of the protruding plate portion.

4. A vehicle door which is mounted via a hinge to an upper edge portion of a door opening portion that is formed on a vehicle body and which is pivotable in an up-down direction, comprising:

a door body formed of metal;

a decorative member which is attached to a vehicle outer side of a lower portion of the door body;

an outer plate portion which is mounted on the decorative member and disposed to be spaced apart from a vehicle outer side surface of the door body and which has a predetermined width in the up-down direction and extends over a substantially overall width in a door width direction;

a bottom plate portion which is mounted on the decorative member and extends from a lower end of the outer plate portion to a vehicle inner side so as to be directed to a position lower than a lower end of the door body; and a protruding plate portion which is provided on the decorative member and protrudes upward from a position close to a vehicle inner side tip of the bottom plate portion, the protruding plate portion having an upper end extending further upward than the lower end of the door body and being continuously formed in a direction from a position close to a first end portion to a position close to a second end portion of the outer plate portion in the door width direction, the protruding plate portion being in contact with the vehicle outer side surface of a lower end portion of the door body, wherein the decorative member is formed by molding, the outer plate portion is formed separately from the bottom plate portion and the protruding plate portion, the bottom plate portion has a bulging portion which bulges upward from an upper surface of the bottom plate portion and inside which a hand insertion recess open to a lower surface of the bottom plate portion is formed, and a fixing portion which is fixed to the outer plate portion is provided on the bulging portion.

5. The vehicle door according to claim 4, wherein the protruding plate portion is provided at a position where the protruding plate portion is overlapped with the bulging portion in an in-out direction of the vehicle.

6. The vehicle door according to claim 4, wherein the outer plate portion has an attachment portion which bulges from a vehicle inner side surface of the outer plate portion to the vehicle inner side and is attached to the vehicle outer side surface of the door body by using an attachment member, and the fixing portion of the bottom plate portion is fastened to the attachment portion by using a fastening member.

7. The vehicle door according to claim 1, wherein a sealing member is provided to be interposed between the protruding plate portion and the vehicle outer side surface of the door body.

8. The vehicle door according to claim 2, wherein a sealing member is provided to be interposed between the protruding plate portion and the vehicle outer side surface of the door body.

9. The vehicle door according to claim 4, wherein a sealing member is provided to be interposed between the protruding plate portion and the vehicle outer side surface of the door body.

* * * * *